May 5, 1970 MITSUO HASEGAWA 3,510,626
APPARATUS FOR WELDING HOLLOW WORKPIECES FROM THE INSIDE
Filed Sept. 18, 1967
2 Sheets-Sheet 2
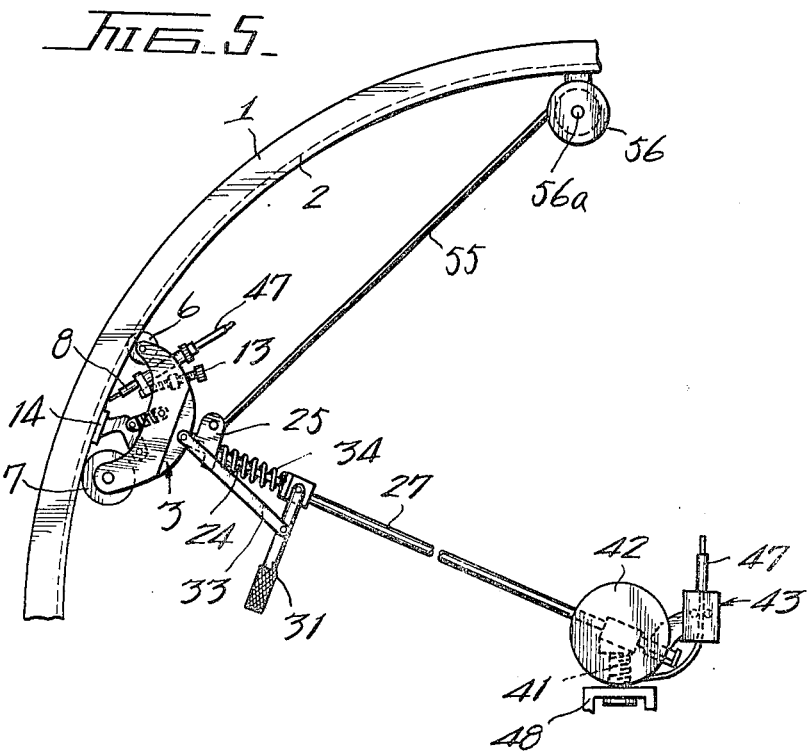
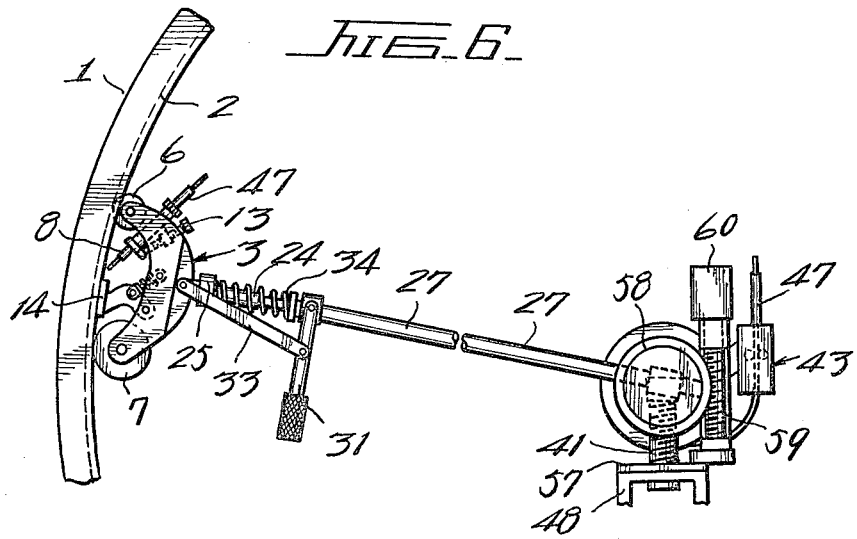
INVENTOR.
MITSUO HASEGAWA
BY
Robert R Strack
ATTORNEY

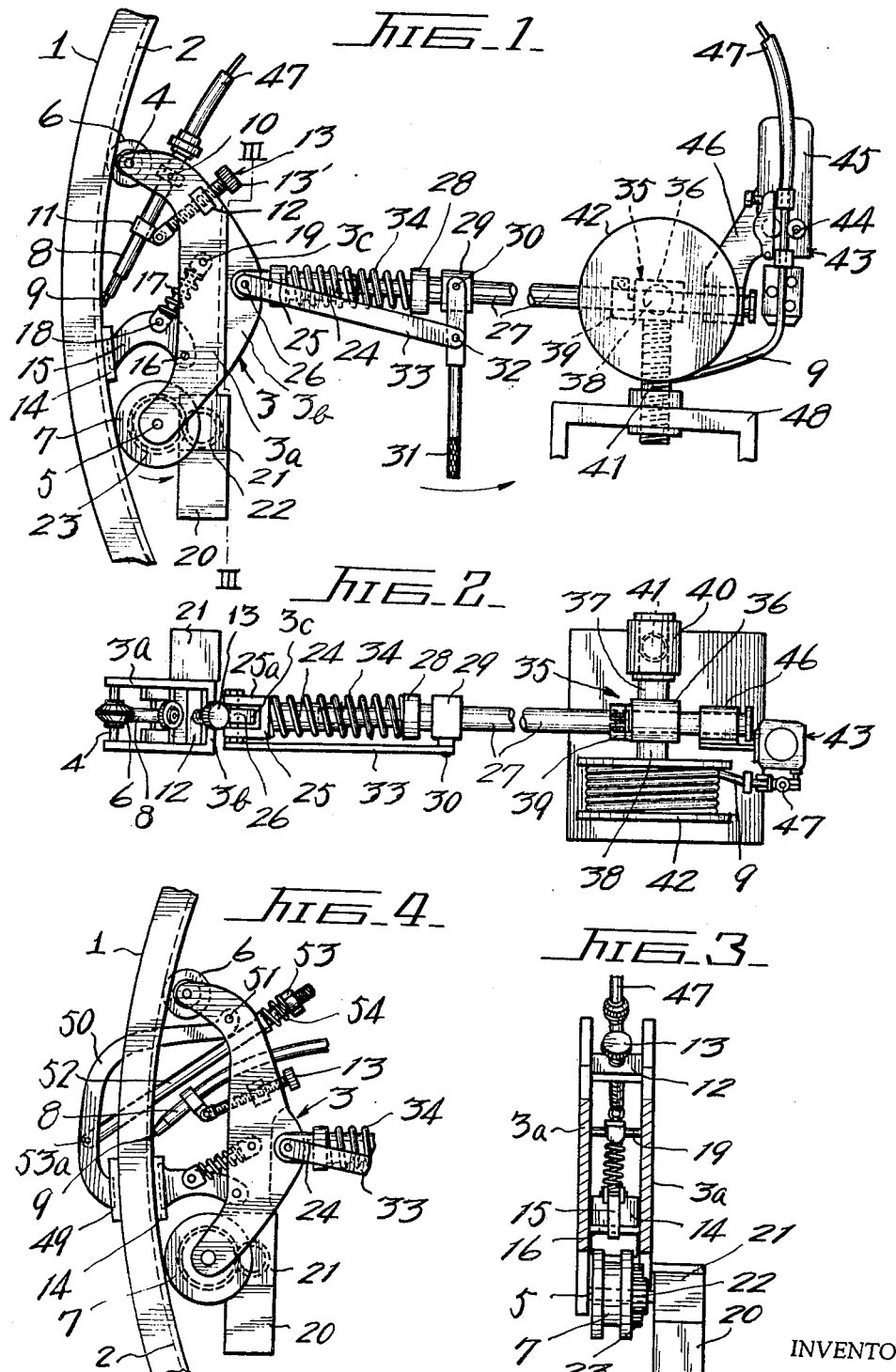

United States Patent Office 3,510,626
Patented May 5, 1970

3,510,626
APPARATUS FOR WELDING HOLLOW WORKPIECES FROM THE INSIDE
Mitsuo Hasegawa, Toyonaka-shi, Japan, assignor to The Osaka Transformer Co., Ltd., Osaka, Japan, a company of Japan
Filed Sept. 18, 1967, Ser. No. 668,329
Int. Cl. B23k 9/12
U.S. Cl. 219—125                                     11 Claims

ABSTRACT OF THE DISCLOSURE

An apparatus for welding hollow workpieces comprising a radial pivotal support means disposed within said workpieces, a journal mechanism supporting said support means, a connection bar telescopically received within said support means, a pressure applying means disposed between said support means and connection bar, a welding means guide mechanism pivoted at said connection bar, and a drive mechanism for said welding means and guide mechanism.

BACKGROUND OF THE INVENTION

Hreretofore, for arc welding the insides of workpieces such as metallic tubes and spherical hollow metallic bodies having relatively large inner diameters, various methods have been proposed and widely practiced for welding such workpieces from the insides thereof along the inner peripheral surfaces of such workpieces. According to the prior art welding methods, welding means are supported by a suitable supporting member within the insides of hollow metallic bodies to be welded together and the welding operation is carried out while the hollow bodies to be welded together are being rotated. According to another welding method, a carriage on which the welding means are mounted is positioned within the hollow metallic bodies to be welded together and the welding operation is carried out by driving the carriage at the same rate as that at which the metallic bodies are rotated so that the welding means are maintained in a state as if they were stationarily held.

However, these prior art welding methods can be employed only when the metallic bodies to be welded together can be rotated by suitable means, but when the bodies are held in position in their installation or service places, for example, and when pipe lines, penstocks, spherical tanks and the like are to be assembled by welding in fields where they are permanently installed, none of the prior art methods are available. Therefore, up to date, for welding the workpieces permanently installed in their service places from inside, manual or semiautomatic welding methods have been exclusively relied upon, but these welding methods are quite inefficient and can not be expected to provide satisfactory welding results.

SUMMARY OF THE INVENTION

The present invention relates to an improved arc welding method and apparatus for carrying out the method, and more particularly to an improved automatic arc welding method for welding various types of hollow workpieces having inner cavities sufficient to receive welding means therein from inside, for example, for automatically welding hollow stationary workpieces such as metallic pipes having relatively large inner diameters, penstocks and spherical tanks having relatively large inner cavities, metallic bodies having circular or oval cross section inner cavities by depositing metal in openings formed between the workpieces to be welded together from inside while stationarily maintaining the workpieces in their service places without the necessity for rotating such workpieces, and apparatus for carrying out the method.

One object of the present invention is to provide an economical welding method for automatically welding workpieces such as cylindrical and hollow bodies from inside by depositing metal in a weld line formed between the workpieces while stationarily maintaining the workpieces in their installation or service place without the necessity for rotating the workpieces.

Another object of the present invention is to provide welding apparatus which is simple in construction, and operation, highly efficient and less expensive.

A further object of the present invention is to provide a welding apparatus of the type in which welding means can be precisely and positively moved along a weld line formed between workpieces such as hollow metallic bodies even if they have oval, oval-like, polygonal inner cross section configurations and rounded inner corners.

In one form of apparatus to be employed in carrying out the method according to the present invention, a welding means support and guide mechanism adjustably supports a nozzle through which a length of wire electrode is guided toward a welding zone, and a pair of rollers which serve to guide the nozzle along a weld line formed between workpieces to be welded together and to drive the mechanism along the inner periphery of the workpieces, respectively, and the support and guide mechanism is connected by a retractive connection bar to one end of a support bar pivoted at one end substantially in the center of an area including the weld line for pivotal movement in any desired direction. A pressure applying means is disposed between the connection bar and support bar for normally urging the welding means support and guide mechanism against the inner periphery of the workpieces and as the support bar pivots in a circumferential direction within the workpieces a pair of rollers mounted on the support and guide mechanism rotate along the weld line while the welding means is caused to move along the welding line. A drive mechanism which moves the welding means support and guide mechanism along the weld line as the support bar pivots in any direction may be one of several known types of mechanisms. One of the drive mechanism is one which drives one of the pairs of rollers mounted on the support and guide mechanism from an electric motor mounted on the support and guide mechanism through a gear mechanism. Another type of drive mechanism is one in which a length of wire or chain is connected at one end to the welding means support and guide mechanism and at the other end to the mounting base of the support and guide or a flange on the connection bar and a winding mechanism is temporarily mounted in a suitable position in one of the workpieces well above the welding zone for winding the chain or wire up. A still other drive mechanism is one in which a length of wire or chain is anchored at one end to a suitable point in one of the workpieces above the welding zone and at the other end to a winding mechanism which is mounted on the welding means support and guide mechanism for winding the wire or chain thereon. According to the present invention, the welding means support and guide mechanism by which the welding means is supported is normally urged against the inner periphery of the workpieces to be welded together by a pressure applying means mounted on the support bar which supports the welding means support and guide mechanism and by guiding the pair of rollers on the support and guide mechanism along the welding line, the welding means can be precisely directed to any desired point along the welding line and moved along the welding line. According to the present invention, even when hollow workpieces to be welded together have circular, oval, circular-like oval-like, or polygonal inner cross section configurations or rounded inner corners, the welding operation can be efficiently performed while the workpieces are held in position or stationarily.

In one preferred form of apparatus according to the present invention, in order to facilitate the positioning of the pair of rollers and the welding means which are supported on the welding means support and guide mechanism at a suitable or desired point along the weld line, a manipulation handle for pressurizing and releasing the pressure applying means is provided at a midpoint on the support bar which supports the welding means support and guide mechanism. By manipulating the handle, the support and guide mechanism can be moved toward and away from the inner periphery of the cylindrical workpieces. Furthermore, the support and guide mechanism can be pivoted in any direction within the workpieces about the pivot point on one end of the support bar. Accordingly, the preparatory procedure necessary for precisely positioning the welding means relative to the weld line can be greatly facilitated and simplified.

According to the present invention, one advantage may be obtainable by the provision of an abutment plate or plates on the support and guide mechanism in such a manner that the abutment plate may frictionally move along the inner periphery of the workpieces striding across the weld line extending from one end of one half semicircular section of the inner periphery of the workpieces to the other end of the same semicircular section, that is, the distance covering 180°, the semi-circular weld line can be continuously welded in one welding operation. In carrying out the novel welding method, firstly, one semicircular distance of the weld line is welded and then the welding means support and guide mechanism is pivoted by 180° to the diametrically opposite direction respect to the position in which the welding operation was performed for the first semicircular distance and then welding operation is carried out for the remaining semicircular distance. And the portions of the weld lines which have been left unwelded at or about the starting and terminal ends of the two welding operations for the two semicircular distances can be deposited with metal by manual welding whereby the entire circular weld line can be perfectly welded.

The above and other objects and advantages of the present invention will be more apparent to those skilled in the art from a reading of the specification in conjunction with the accompanying drawings in which preferred embodiments of the present invention are shown for illustration purpose only, but not for limitation of the scope of the invention.

BRIEF DESCRIPTION OF THE DRAWINGS

FIG. 1 is a fragmentary side elevational view in partial section of one preferred form of arc-welding apparatus constructed in accordance with the present invention showing the apparatus with some parts thereof broken away;

FIG. 2 is a fragmentary top plan view of said apparatus shown in FIG. 1;

FIG. 3 is a view as seen in the arrow direction along the III—III in FIG. 1 especially showing a welding means support and guide mechanism of said welding apparatus;

FIG. 4 is fragmentary side elevational view of a modified form of welding means support and guide mechanism according to the present invention;

FIG. 5 is a fragmentary side elevational view especially showing one form of drive mechanism for said welding means support and guide mechanism shown in FIGS. 1, 2 and 3 or that shown in FIG. 4; and FIG. 6 is similar to FIG. 5, but shows a modified form of drive mechanism.

PREFERRED EMBODIMENTS OF THE INVENTION

FIGS. 1, 2 and 3 illustrate one preferred form of arc welding apparatus according to the present invention by which the process of the present invention can be successfully carried out. As shown in these figures, principal operative parts including a welding nozzle (of which description will be made hereinbelow) are supported by a bifurcate support or guide mechanism 3 of a U-shape cross section as seen in FIG. 2. The bifurcate support or guide mechanism 3 generally comprises a pair of opposite and parallel plate portions 3a which are connected at their rear ends (the right hand ends as seen FIGS. 1 and 2) by means of a transverse connection portion 3b to each other, a base portion 3c which extends rearwardly of the transverses connection portion 3b (the right hand direction as seen in FIGS. 1 and 2), a guide roller 6 which is rotatably supported on a transverse shaft 4 at one adjacent end of the pair of plate portions 3a (the upper ends as seen in FIGS. 1 and 2) and a drive roller 7 which is rotatably supported on a transverse shaft 5 at the other ends of the plate portions 3a (the lower ends as seen in FIGS. 1 and 2). These rollers 6 and 7 are adapted to rotate along and in contact with the circular inner peripheral surface 2 of workpieces 1 in a form of cylinder to be welded together by the process and apparatus according to the present invention. To put more definitely, the guide roller 6 is adapted to enter a beveling or V-groove formed between the workpieces 1 which are arranged in an end-to-end relation and rotates along the beveling on the inner side thereof. For the purpose, the guide roller 6 tapers radially from its center toward the outer peripheral edge. The drive roller 7 has a larger diameter than the guide roller 6 and is adapted to rotate along and in contact with the circular inner peripheral surface 2 striding across the beveling. For the purpose, the entire outer periphery of the drive roller 7 is formed with a circular recess in the center portion of the outer periphery thereof, i.e., the drive roller is formed in a taper configuration, so that the center portion in the outer periphery of the drive roller may be prevented from contacting the bottom of the beveling. The peripheral portions on the opposite sides of the circular recess in the outer periphery of the guide roller 7 are preferably rugged so that the roller may be effectively prevented from slipping as the roller rotates along and in contact with the circular inner periphery 2 of the workpieces 1. A nozzle 8 through which a continuous length of consumable electrode 9 is guided extends through between the opposite plate portions 3b of the support and guide mechanism 3 and is pivoted at 10 to the plate portions. A nozzle grip member 11 is mounted on the nozzle 8 surrounding the nozzle in a suitable position between the nozzle tip and the pivot pin 10 and is connected by means of a conventional universal joint (not shown) to one end of a headed screw 13 which extends through and in threaded engagement with a cross bar 12 which in turn transversely extends and connects between the opposite plate portions 3a adjacent to the nozzle 8 so that by turning the screw 13 by means of its integral head 13' the angular position of the nozzle 8, and accordingly, of the electrode wire 9 relative to the beveling in the workpieces 1 may be adjusted as desired within a range permitted by the specific connection arrangement.

An arcuate support arm 15 extends from the front side of support or guide mechanism toward the circular inner periphery 2 of the workpieces 1 and one end of the arm is pivoted at 16 to the support mechanism 3 adjacent to or below the headed screw 13. The other end of the arcuate support arm 15 detachably supports an abutment plate 14 which is preferably formed of copper and the abutment plate has a radius of curvature which is substantially the same as that of the inner periphery 2 of the workpieces 1. The copper abutment plate 14 is provided for the purpose that as the welding operation proceeds along the circular inner periphery 2 of the cylindrical workpieces 1 from bottom to top in one semi-circular half section of the inner periphery the abutment member abuts against the succeeding welded portions in the beveling in which the deposit metal which has been just deposited and is still in varying molten states and may effectively prevent the still fluid metal in such portions from falling or dripping down. For the purpose, the copper abutment plate 14 is so arranged that the plate always follows the movement of the nozzle 8 and accordingly, of the wire electrode 9 while keeping a substantially uniform angular distance from the electrode wire 9. The arcuate support arm 15 is connected at a point between the opposite ends by a transverse pin 18 to one end of a compression spring 17 and the other end of which is in turn connected by means of a pin 19 extending through between the opposite plate portions 13a of the welding means support and guide mechanism 3 to the support mechanism 3 whereby the arcuate support arm 15 may be normally urged in the counter-clockwise direction by the force of the spring 17 and accordingly, the copper plate 14 secured at the free end of the arm 15 may be also urged against the inner periphery 2 of the workpieces 1. One of the two plate portions 3a of the support and guide mechanism 3 mounts an electric motor 20 for driving the drive roller 7 and a conventional reduction gear 21 thereon. A gear 23 is fixedly mounted on the pivot shaft 5 on which the drive roller 7 is mounted and a pinion 22 of the reduction gear 21 meshes the gear 23 whereby the drive roller 7 may be positively driven as the electric motor 20 is energized or rotated.

A horizontal connector bar 24 is connected to the base portion 3c of the welding means support and guide mechanism 3 and one half portion of the connector bar in the longitudinal direction thereof (the right hand half portion as seen in FIGS. 1 and 2) is formed in a hollow or tubular shape while the end of the remaining half portion of the connector bar in the longitudinal direction thereof (the left end of the bar as seen in FIGS. 1 and 2) is formed in a U-shape flange 25 so as to provide a connection portion 25a. The connection portion 25a receives the opposite end of the base portion 3c of the support and guide mechanism 3 and a transverse pin 26 extends transversely through the junction between the connection portion 25a and the base portion 3c. The right hand end of the hollow or tubular half portion of the connection bar 24 frictionally or telescopically receives the adjacent reduced diameter end (not shown) of a support bar 27 and the other end of the support bar 27 is suitably supported within a suitable support mechanism of which description will be made hereinbelow in detail. The support bar 27 fixedly mounts a pair of longitudinally spaced flanges 28 and 29 thereon with the former disposed adjacent to the reduced diameter end and the latter disposed inwardly spaced from the former. A handle 31 is pivotally connected at 30 to the flange 29 and a pin 32 extends laterally of the handle 31 at a point between the opposite ends of the handle. A lever 33 slantly extends between the support and guide mechanism 3 and handle 31 with one end of the lever pivoted by the transverse pin 26 to the base portion 3c of the support and drive mechanism 3 and the other end thereof pivoted by the pin 32 to the handle 31. A compression spring 34 is disposed on the connection bar 24 with one end abutting against the flange 25 on the connection bar 24 and the other end abutting against the flange 28 on the support bar 27 so that the connection bar 24 is normally urged toward the left hand direction (as seen in FIGS. 1 and 2). Accordingly, when the welding means support and guide mechanism 3 is in the position as shown in FIG. 1, the mechanism is urged toward and against the circular inner periphery 2 of the workpieces 1 and accordingly, the guide roller 6, drive roller 7 and abutment plate 15 all of which are supported by the mechanism 3 are caused to contact the inner periphery of the workpieces 1. However, when the handle 31 is pivoted in the counter-clockwise direction as shown with the arrow in FIG. 1, the lever 33 which is pivoted to the handle 31 compresses the spring 34 which in turn radially moves the support and guide mechanism 3 away from the inner periphery 2 of the workpieces 1 and toward the center of the cylindrical workpieces 1 (the center of the circular cross section of the workpieces) and accordingly, the guide roller 6, the drive roller 7 and abutment plate 14 which are mounted on the support and guide mechanism 3 are also moved away from the inner periphery 2 of the workpieces 1.

In FIGS. 1 and 2, reference numeral 35 designates a support mechanism for the support bar 27 and the support mechanism is adapted to move the welding means support and guide mechanism 3 in any desired direction through the support bar 27. The bar support mechanism 35 generally comprises a cylindrical sleeve member 36 having a center bore through which the rear end of the support bar 27 (the right hand end as seen in FIGS. 1 and 2) extends a pair of diametrically opposite horizontal arms 37 and 38 which project outwardly and laterally of the two diametrically opposite sides of the sleeve member 36 and a rotary vertical strut 41 on the top of which a horizontal cylindrical sleeve member 40 is mounted and the sleeve member is provided with a center bore through which the arm 37 loosely extends. The arm 37 is provided with a circular opening having a diameter sufficient to loosely receive the vertical strut 41 so that the arm may rotate about the strut. The lower portion of the vertical strut 41 is rotatably mounted on a framework 48 on which a conventional power supply source and its associated parts are also mounted in the known manner (not shown). The strut 41 is mounted on the framework 48 in such a manner that the longitudinal axis of the strut may lie substantially in the center of an area including the weld line in the cylindrical workpieces 1. The cylindrical sleeve member 36 is also provided with a fastening means 39 which is adapted to hold the support bar 27 in any desired position with respect to the slave member 36. Therefore, the support bar 27 may be freely rotated about the vertical strut 41 together with the sleeve member 36 on which the bar 27 is held in position in the horizontal direction. The support bar 27 may be also rotated in the circumferential direction along the peripheral surface 2 of the cylindrical workpieces 1 about the axis of the sleeve member 40 and the arm 37 together with the sleeve member 36 because the arm 37 is loosely fit in the sleeve member 40. The other arm 38 of the sleeve member 36 has at its outer or free end a wire electrode supply reel 42 rotatably mounted. In addition, the extreme right hand end of the support bar 27 (as seen in FIGS. 1 and 2) supports a conventional wire electrode feed device 43 by means of a support bracket 46 which is in turn mounted on the support bar end and the wire electrode feed device comprises a conventional pair of opposite feed rolls 44 and a conventional electric motor 45 which are arranged in the manner known to the art. A length of wire electrode 9 wound on the reel 42 is unrolled from the reel and fed at a predetermined constant rate through a conventional flexible guide tube 47 and the nozzle 8 to the welding zone.

Now, the novel welding process with the use of the above-mentioned welding apparatus will be described in connection with an instance in which a beveling or V-groove formed between the cylindrical workpieces 1 is filled with metal deposit. Firstly, the handle 31 is manually pivoted about the pivot pin or fulcrum 30 in the counterclockwise direction shown with the arrow in FIG. 1 so as to move the welding means support and guide mechanism 3 away from the inner periphery 2 of the workpieces 1 to a predetermined distance. With the support and guide mechanism 3 held away from the workpiece inner periphery 2, the position of the mechanism 3 held away from the workpiece inner periphery 2, the position of the mechanism 3 is adjusted so that the outer peripheral edge of the guide roller 6 and the drive roller 7 may be aligned with the beveling or V-groove formed between the workpieces and the nozzle tip may be positioned in a suitable position for carrying out the operation with respect to the beveling. Thereafter, the handle 31 is released whereupon the support and guide mechanism 3 is pivoted back to the initial position in the clockwise direction by the force of the spring 34 and accordingly, the guide roller 6 and drive roller 7 may be caused to contact the inner periphery 2 of the cylindrical workpieces 1 and the nozzle tip may be in a suitable welding position with respect to the beveling. Simultaneously, the copper abutment plate 14 on the support arm 15 pivoted to the support and guide mechanism 3 may be also caused to contact the inner periphery 2 of the workpieces 1 in a position spaced from and following the starting point where the welding is initiated by the force of the spring 17 secured at the opposite ends to the support arm 15 and mechanism 3. Then, the headed screw 13 is manually turned in either direction by means of the head 13' thereon so that the tip of the nozzle 8 and accordingly, the extension of the wire electrode 9 may be properly directed to the beveling in the workpiece inner periphery 2. Thereafter, power is supplied to the welding zone from the conventional power supply source (not shown) whereby an arc may be established between the workpieces 1 and the wire electrode extension 9 and thus, the welding operation can be initiated. As the electrode wire 9 melts away while the operation is progressing, the wire feed device 43 feeds the wire electrode at the same rate at which the wire melts away. Simultaneously, the drive roller 7 is rotated in contact with the inner periphery 2 of the workpieces 1 in the arrow direction in FIG. 1 by the electric motor 20 through the reduction gear 21 and the rotation of the drive roller 7 in the above direction causes the support and guide mechanism 3 to move upward (as seen in FIG. 1) along the inner periphery 2 of the cylindrical workpiece 1 whereby the nozzle 8 mounted on the support and guide mechanism 3 also move along one semicircular half section of the inner periphery of the workpiece as the mechanism 3 moves along in the manner mentioned just above and the succeeding portions of the beveling or V-groove in the semicircular inner periphery section of the workpieces are deposited with metal. In this case, molten metal which has been just deposited and still in a fluid state can be effectively prevented from falling and/or dripping down out of the beveling by means of the copper abutment plate 14 which contacts and moves along the inner periphery 2 of the cylindrical workpieces 1 in pursuance of the movement of the nozzle 8 keeping predetermined angular distance from the nozzle whereby the welding operation can be satisfactorily carried out. Since the welding means support and guide mechanism 3 is pivotally supported by the connection and support bars 24 and 27 which are unitarily connected to the sleeve member 36 the one arm 37 of which is rotatably received within the sleeve member 40 and is normally urged against the inner periphery 2 of the cylindrical workpieces 1 by the force of the spring 34, even there are uneven areas in the inner periphery 2 of the workpieces the movement of the support and guide mechanism 3 along the inner periphery 2 of the workpieces 1 will not be substantially obstructed and therefore, the welding operation can be satisfactorily performed regardless of presence of such uneven areas in the workpiece inner periphery. In addition, even if the weld line is not perfectly linear, but the line assumes a somewhat zigzag configuration, since the support and guide mechanism 3 is permitted to pivot about the strut 41 by the aid of the guide roller 6, the electrode wire can be effectively prevented from deviating out of the weld line.

When the above welding operation has proceeded to a substantially midpoint of the circumference of the cylindrical workpieces 1 or about 180° of the circumference has been welded, then welding operation is temporarily interrupted and the handle 31 is again pivoted in the counter clockwise direction of in the arrow direction in FIG. 1 so as to move the support and guide mechanism 3 away from the inner periphery 2 of the cylindrical workpieces 1 to a suitable distance. After the mechanism 3 has been moved away from the workpiece inner periphery 2 in the above manner, the combined connection and support bars 24 and 27 are pivoted by 180° about the vertical strut 41 from the position as shown in FIG. 1 to the diametrically opposite position so that the free side of the support and guide mechanism 3 (the side on which the guide roller 6 and the drive roller 7 are mounted) may face the yet-to-be welded arcuate inner periphery or remaining half semicircular inner surface of the workpieces 1 and in this case the support and guide mechanism 3 is preferably positioned adjacent to the lower end of the second semicircular inner periphery where the welding operation is initiated for the remaining half semicircular inner surface. Thereafter, the handle 31 is released to allow the same to pivot back to the initial position. Then, the procedure described in connection with the welding of the first half semicircular inner periphery of the workpieces 1 is repeated so that the tapered outer peripheral edge of the guide roller 6 may be positioned in the beveling or V-groove, the drive roller 7 may stride across the beveling and the nozzle tip 8 may be located in a suitable operation position with respect to the beveling. Thereafter, the same welding operation is initiated on the second half semicircular inner periphery beginning with the lowermost end of the half semicircular section and ending at the uppermost end of the same section. In carrying out the welding operation on the two semicircular inner peripheral sections of the workpieces, it will be understood that each welding operation on each half semicircular surface section can not be performed covering the entire 180° angular distance, and there are unwelded portions remain at and adjacent to the upper and lower junctions between the two half semicircular surface sections although such unwelded portions are very limited areas, such portions must be welded by the manual or semi-automatic welding process as well known in the art whereby the entire inner peripheral surface of the workpieces can be welded.

FIG. 4 shows a modified form of welding means support and guide mechanism according to the present invention and the mechanism is suitably employed for butt-welding two cylindrical workpieces in which the two cylindrical workpieces having the flat opposite ends to be end-to-end welded are laid down with a suitable space between the opposite ends thereof end-to-end welded from the inside of the workpieces employing electro-slag welding method, the electro-gas welding method or the automatic vertical welding method.

As shown in FIG. 4, the modified welding means support and guide mechanism 3 further has a second copper abutment plate 49 in addition to the copper abutment plate 14 of the first embodiment of support and guide mechanism. The second or additional abutment plate 49 is identical with the first abutment plate 14 in construction and in material, but the second abutment plate 49 is adapted to be applied against the outer periphery of the two cylindrical workpieces 1 striding across the space between the opposite ends of the workpieces in a diametrically opposite relation to the first abutment plate 14 which is to be applied against the inner periphery of the cylindrical workpieces 1 striding across the same space between the opposite ends of the workpieces. The additional copper abutment plate 49 is supported at the free end of a support arm 50 which extends through the space between the opposite ends of the two workpieces 1 and the opposite plate portions 3a of the mechanism and which had the other end pivoted at 51 to the support and guide mechanism 3 adjacent to or above the nozzle 8. A bar 52 extends through the opposite plate portions 3a of the support and guide mechanism 3 and the space between the opposite ends of the workpieces 1 and has one end pivoted at 53a to a point between the opposite ends of the support arm 50 while the other end extends through a transverse member (not shown) between the two opposite plate portions 3a in a position between the support arm 50 and the nozzle 8. The bar 52 has a thread at the other end and a nut 53 is threaded on the threaded end. A spring 54 is disposed around the bar between the transverse member and the nut 53 whereby the additional abutment plate 49 is normally urged against the outer periphery of the workpieces 1 striding across the space between the opposite workpiece ends as mentioned above. With the above construction and arrangement of the modified form of welding means support and guide mechanism, as the mechanism 3 moves upward along and in contact with the inner periphery of the workpieces 1 while the welding operation is proceeding, the first and additional copper abutment plates 14 and 49 abut against the opposite sides of the workpieces 1 striding across the space to be welded whereby the molten metal which has been just deposited and is still in a fluid state may be effectively prevented from falling and/or dripping down on either side of the space. In either of the two different forms of support and guide mechanisms described hereinabove, the support and guide mechanism 3 is adapted to be driven and caused to move upward along and in contact with the inner periphery of the workpiece striding across the space between the opposite ends of the workpieces 1 by the electric motor 20 through the reduction gear 21 and drive roller 7, but each of the support and guide mechanisms may be also driven by any other suitable drive mechanism.

As shown in FIG. 5, for example, a length of wire or chain 55 is anchored at one end to the flange 25 on the connection bar 24 (alternatively, the end may be anchored to the base portion 3c) and the other end of the wire or chain is anchored to and wound on the periphery of a winding drum 56 which is temporarily mounted on the inner periphery of the workpieces in a position at or near the upper end of either one half semicircular section of the inner periphery 2 by such as tack welding. As the drum 56 is rotated in the chain or wire winding-up direction by any suitable conventional electric motor (not shown) through the shaft 56a on which the drum is fixedly mounted, the support and guide mechanism 3 may be driven upward along and in contact with the inner periphery of the workpieces 1 striding across the space between the opposite ends of the workpieces 1.

FIG. 6 shows a further modified form of drive mechanism for the support and guide mechanism according to the present invention. As shown in FIG. 6, the vertical strut 41 is formed with an integral base plate 57 for rotational movement with the strut and the strut assembly is rotatably supported by the framework 48 disposed within the workpieces 1. The arm 38 of the support mechanism 35 (FIG. 2) is also provided with a gear 58 inwardly of and spaced from the wire electrode reel 42 and the gear 58 meshes a worm 59 which is rotatably supported by the strut base 57. An electric motor 60 is provided for driving the worm 59. Therefore, as the motor 60 is driven, the rotational movement of the motor as transmitted through the worm 59, gears 58 to the support bar 27. The rotational movement of the support gear 27 is then transmitted through the above-mentioned transmission means to the support and guide mechanism 3 whereby the mechanism may be rotated upward along and in contact with the inner periphery of the workpieces 1 striding the space between the workpieces.

Although the above descriptions have been made in connection with the welding of cylindrical or tubular workpieces having true circular inner peripheries for the purpose of explanation of the present invention, it should be understood that the application of the present invention is no way limited to such workpieces only, but the invention can be also applied for welding spherical tanks, hollow members having spherical inner cross sections and other workpieces having oval or oval-like inner cross sections. The present invention can be further applicable for welding the insides of box-shape workpieces having inner angular, square and the like configurations except for the inside corners thereof. When the novel welding apparatus is employed for welding the insides of workpieces having angular cross sections, although the distance between the welding zone and the nozzle tip changes from time to time while the welding operation is proceeding, as mentioned above the support and guide mechanism 3 is normally adapted to be urged against the inner periphery of the workpiece by the spring and accordingly, the guide roll, drive roll and abutment plate or plates may be in positively contact with the inner periphery of the workpieces with a suitable amount of pressure. Thus, it will be understood that the present invention can be suitably employed for welding the inner surfaces of a wide variety of hollow workpieces having a wide variety of inner cross section configurations.

While several preferred embodiments of the invention have been shown and described in detail it will be understood that they are for the purpose of illustration only and are not to be taken as a definition of the scope of the invention, reference being had for this purpose to the appended claims.

What is claimed is:

1. A welding apparatus having nozzle means for welding circumferential seams upon the inside of hollow workpieces comprising radial pivotal support means disposed within said workpiece and having its fulcrum substantially in the center of an area defined by a weld line formed between said workpieces, said support means permitting rotation in the circumferential direction of said nozzle means, a journal mechanism supporting said support means at one end thereof permitting rotational movement about a vertical axis, a connection bar having one end telescopically received within the other end of said support means, pressure applying means disposed between said support means and said connection bar, a welding means support and guide mechanism pivoted at the other end of said connection bar and normally urged against the inner periphery of said workpiece by the action of said pressure applying means; said nozzle means having a nozzle, supported by said welding means support and guide mechanism guiding a wire electrode toward said weld line, a pair of rollers comprising means to rotate along and in contact with the weld line, driving means for moving said welding means support and guide mechanism along said weld line; and an adjusting means for said nozzle, supported by said welding means support and guide mechanism, comprising means to adjust the angular position of said nozzle relative to the weld line formed, and an abutment member elastically connected to said welding support and guide mechanism comprising means to be urged against the inner periphery of the workpieces striding across said weld line in a position below said nozzle.

2. The apparatus according to claim 1, wherein said welding means support and guide mechanism comprises a base portion having a pair of opposite and parallel plate portions forming a bifurcated member.

3. The apparatus according to claim 1, wherein the projecting ends of said bifurcated plate sides rotatably support rollers, and the nozzle through which said wire electrode passes is mounted by a transverse section extending between and connecting said opposite and parallel plate portions together on said welding means support and guide mechanism whereby the angular position of the nozzle relative to the weld line may be readily adjusted.

4. The apparatus according to claim 1, wherein a pivotal support arm is supported by said welding means support and guide mechanism, said pivotal support arm having one end pivoted by a transverse pin extending between and connecting said plate portions together to said mechanism, and the other end of said support arm supporting said abutment member, said support arm being normally urged toward said weld line by a spring having one end secured to the arm and the other end secured to said mechanism so that said abutment member may be normally urged against the weld line.

5. The apparatus according to claim 1, wherein a second support arm is pivotably supported at one end by said welding means support and guide mechanism, said second support arm extending through and between said opposite and parallel plate portions to the outer periphery of said workpieces, the other free end is provided with a second abutment member, and a threaded bar, extending through and between said opposite and parallel plate portions, having one end connected to said second support arm whereby said second abutment member may be normally urged against the outer periphery of the workpieces.

6. The apparatus according to claim 1, wherein one of said rollers is driven by a geared electric motor mounted on said mechanism and the other of said rollers serves as a guide roller, said support means having a support bar, one end of which is connected to the radial pivoted end of said support means, and which is normally biased in the expansion direction by a spring disposed between said connection bar and said support bar, the other end of said connection bar rotatably supporting the base portion of said welding means support and guide mechanism.

7. The apparatus according to claim 1, wherein said support means further comprises a sleeve member having a bore loosely receiving one end of said support bar, and a pair of lateral and horizontal arms extend from opposite sides of said sleeve member normally to the axis of said bore, and a vertical strut having a horizontal sleeve member at the upper end for rotatably receiving one of said pair of arms and rotatably supported at the lower end of a framework disposed within said workpieces.

8. The welding apparatus according to claim 7, wherein another sleeve member receiving one of said horizontal arms is loosely fitted on said vertical strut for rotational movement about said strut, said other horizontal arm rotatably supporting a wire electrode reel, the end of said support bar extending out of said bore supporting a wire electrode feed device by means of a support bracket secured to said end of said support bar.

9. The welding apparatus according to claim 7, wherein said drive mechanism for moving said welding means support and guide mechanism along said weld line as said support bar pivots comprises a rotary base plate integral with said rotary mounted vertical strut, a worm disposed on said base plate, a gear mounted inwardly of and spaced from a wire electrode reel which meshes with said worm, and an electric motor for driving said worm.

10. A welding apparatus as set form in claim 1, in which said drive mechanism for moving said welding means support and guide mechanism along said weld line as said support bar pivots comprises a length of wire or chain having one end secured to a flange on said connection bar or the base of the support and guide mechanism and the other end secured to a winding device temporarily mounted on the inner periphery of said workpieces in a position above said welding zone for winding said wire or chain thereon.

11. A welding apparatus as set forth in claim 1, in which said drive mechanism for said welding means support and guide mechanism comprises a length of wire or chain having one end secured to said inner periphery of the workpieces in a position above the welding zone and the other end secured to a winding device mounted on said welding means support and guide mechanism for winding said wire or chain thereon.

References Cited

UNITED STATES PATENTS

| | | | |
|---|---|---|---|
| 1,539,383 | 5/1925 | Bienenstok | 219—125 |
| 1,846,470 | 2/1932 | Burnish | 219—60 |
| 3,201,561 | 8/1965 | Damon | 219—125 |
| 3,244,345 | 4/1966 | Johnson | 219—125 |

JOSEPH V. TRUHE, Primary Examiner

L. A. SCHUTZMAN, Assistant Examiner

U.S. Cl. X.R.

219—60; 228—45